June 18, 1968  L. M. NASH  3,388,536

STABILIZED SELF-SUPPORTED FILTER

Filed Sept. 16, 1966

INVENTOR
LAWRENCE M. NASH
BY
ATTORNEY

United States Patent Office 3,388,536
Patented June 18, 1968

3,388,536
STABILIZED SELF-SUPPORTED FILTER
Lawrence M. Nash, East Brunswick, N.J., assignor to Johnson & Johnson, a corporation of New Jersey
Filed Sept. 16, 1966, Ser. No. 580,042
4 Claims. (Cl. 55—492)

ABSTRACT OF THE DISCLOSURE

A self-supported filter having at least two layers of filter material and a support frame between the layers. The layers of the same size and shape and the frame is positioned between the layers and is substantially rectangular in shape and extends adjacent the entire periphery of the layers. The second portions of the frame is disposed within the area defined by the first portion. There is a resilient third portion of at least one string extending from one side of the rectangular first portion to the opposite side. The layers are secured together along the outer periphery of the first portion of the frame and the layers and the resilient third portion are secured at the second portion of the frame.

---

This invention relates to an improved filter, and more particularly, to such a filter formed of permeable fibrous material with a stable internal self-supporting frame.

Most filters used in air conditioning apparatus, heating apparatus, and for other purposes are supported by a metal of cardboard frame extending about the edges of the filter and overlapping both the front and back edges of the filter. Some of these filters also have expanded metal grids or similar structures on one or both surfaces to support the filter. In some prior art filters, coarse screens have been embedded in the fibrous material for supporting the filter. However, in all of these prior art filters, the support material considerably reduces the effective area of the filter, sometimes even up to 20 percent of the effective area of the filter. Furthermore, when the edge-type supported filter is used in apparatus in which filters are butted edge to edge, there is left a gap or a spaced through which contaminated air readily passes.

There are presently available some internally supported filters which comprise two layers of filter material secured together to contain an internal support. A problem with such filters is that the layers cannot be secured together right at the support and hence there is some slack in the filter material. In use this slack allows the filter material to buckle and if the air flow through the filter varies, the filter may vibrate slightly shaking off some of the material it has collected. This can be a serious disadvantage in some applications, such as filtering air in a paint spray booth.

The filter of the present invention elminates these problems; it does not buckle in use, is stable, simple to construct and very economical. The support for the filter of the present invention only slightly reduces the effective area of the filter. Furthermore, the filters of the present invention form a tight seal with any of the known filter holders and may be butted edge to edge with a tight seal thereby preventing contaminated air from passing between the edges of butted filters. Also the filters of the present invention do not buckle or bulge during use.

In accordance with the present invention, my self-supported filter comprises at least two layers of a permeable fibrous filtering material and a support frame between the layers. The filtering layers are substantially the same size and shape and are disposed in face to face relationship with each other and preferably contact each other over substantially their entire face. The frame comprises three portions which are disposed between the layers. The first of these portions extends adjacent substantially the entire periphery of the layers but is spaced slightly inward from this periphery. The second portion is disposed within the peripheral area formed by the first portion and its purpose is to reduce buckling. The third portion is resilient and extends between opposed points on the first portion and further reduces buckling and stabilizes the filter.

The position of the second portion may vary according to the size and shape of the final filter. For example, if a square filter is used, the second portion may be right in the center of the filter, whereas if a rectangular filter is used, two such supports might be used disposed equidistant from each other and from the edges of the filter.

The position of the third portion may vary but generally extends between opposite sides of the first portion of the frame. For example, in a rectangular filter a nylon string may be tied between the short sides of the rectangle to form the third portion and unexpectedly remove the slack between the frame and filter material and produce a stable filter. If desired, again depending on the size and shape of the filter, a plurality of such strings may be used.

The layers are secured to each other adjacent the frame portions.

In accordance with the present invention, the layers of filter material are made from thermoplastic fibers, such as, polyester fibers, or they may be fibers coated or bonded with a thermoplastic material. The layers are secured to each other heat sealing along the outside of the first or peripheral frame portion and immediately adjacent thereto, and the layers are heat sealed to each other immediately adjacent a portion of the periphery of the second frame or inner frame portion. The third portion is secured to both layers of filter material wherever the heat seal crosses the third portion of the frame.

Securing the layers together by heating sealing as described above holds the support in place and makes the filter stable during use. Also the heat sealing operation does not substantially reduce the effective filtering area of the filter. Furthermore, the heat seal lines add to the stability of the filter.

In many of the highly efficient filters, the fibrous material has been treated with a tacky or sticky substance to improve filtration. With such type filters an adhesive cannot be used to secure layers together as it just does not bind the tacky substance. However, in accordance with the present invention, the layers of my filter may be secured together by heat sealing without any interference by the tacky substance.

The invention will be more fully described in conjunction with the accompanying drawings in which.

Figure 1:
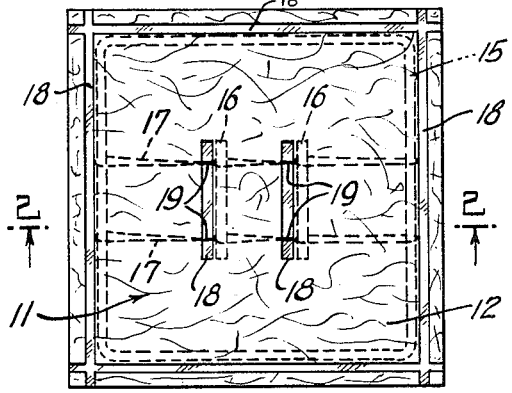
FIGURE 1 is a face view of one embodiment of the filter of the present invention.

Referring to the drawings, in FIGURE 1 there is shown a self-supported filter 11 of the present invention. As more clearly shown in FIGURE 2, the filter comprises two layers 12 and 13 of fibrous filtering material. Between these layers there is disposed a three-part frame 15, 16 and 17. The first part 15 extends about the periphery of the filter, the second part 16 is disposed in the central portion of the filter, and the third part 17 comprises at least one string which extends between opposite sides of the first part 15. The layers of filtering material are sealed to each other 18 along the outer edge of the frame 15 and along a portion of the frame 16. The strings 17 are drawn taut about the frame 15 and are secured to both layers of filtering material at points 19.

Figure 3:
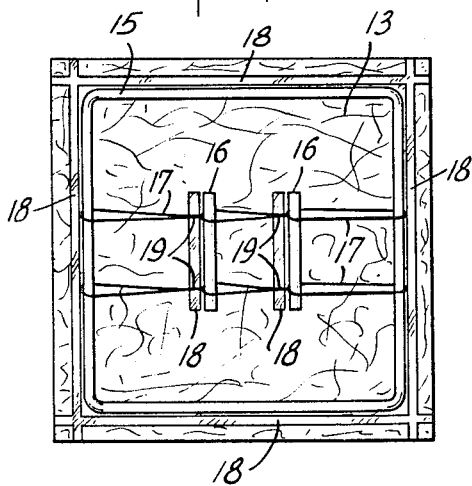
FIGURE 3 is a face view of the filter of FIGURE 1 with the outer layer of fibrous material removed.

In FIGURE 3 the upper layer 12 has been removed so that the exact positioning on the frame 15 as it lies on the lower filtering layer 13 is shown.

Figure 4:
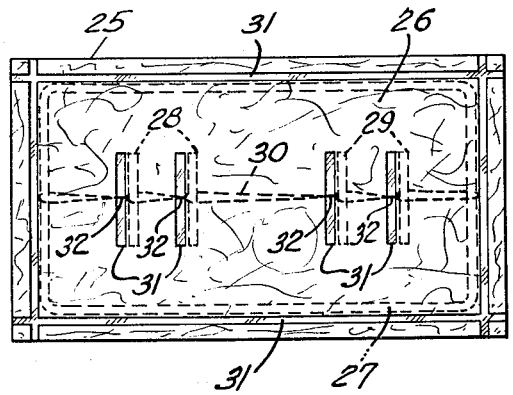
FIGURE 4 is a face view of another embodiment of the filter in accordance with the present invention.

In FIGURE 4 there is shown another embodiment of the filter of the present invention. In this figure there is shown a rectangular filter 25. The fibrous filtering material 26 is supported on a frame comprising four portions 27, 28, 29 and 30. The first portion 27 extends about the periphery of the filtering material while the second and third portions 28 and 29 are disposed in the central portion of the filter and are spaced so as to prevent buckling of the filter during use. The fourth portion 30 comprises a string extending between the opposite short sides of the rectangular first portion. The layers are sealed together along portions of the frames at 31. The string 30 is taut about the frame 27 and is secured to both layers of filtering material at points 32.

The filtering material may be made from any of the various known thermoplastic fibers. Examples of such fibers would be acetate fibers, polyamide fibers, polyester fibers, etc.

The fibers are generally disposed in batt form by means well known in the art, such as, garnetting, carding, air-laying, water-laying, etc. If desired, the batt may be compressed so that the fibrous material is denser or thicker batts may be used which generally provide a more tortuous path for air flow. Generally the fibers lie in overlapping, intersecting relationship, sometimes with very little orientation, other times with a reasonably high degree of orientation. When using batts having high fiber orientation, generally a number of these batts may be laid at angles to each other.

In a preferred embodiment of the present invention, the batt is treated with a tackifier or similar substance which maintains the batt tacky during use and makes the filtering medium more efficeint. Preferred tackifiers would be the polybutenes, though many of the nonmigrating oils may also be used. It is also preferred that the tackifier only be placed on the downstream side of the filter media with the upstream side of the filter left free of such material. If desired, other additives, such as, bacteriostats, germicides, etc., may also be applied to the filtering materials of the present invention.

The filtering materials may be of various sizes and shapes depending upon the apparatus with which they are to be used. The filtering materials may be square, rectangular, circular, polysided, etc., and the exact size will, of course, depend upon the apparatus in which the filtering material is to be inserted.

A minimum of two batts having the same size and shape must be used in accordance with the present invention. At least one batt must be disposed on each side of the frame and encase or embed the frame. If desired, more batts may be used, and these may be disposed equally on both sides of the frame or more on one side of the frame than the other as desired.

The batts must be disposed in face to face relationship and between the batts is placed the self-supporting frame. The frame comprises three portions. The first portion extending substantially about the periphery of the batts, but spaced slightly therefrom. It is preferred that the spacing be between about one-half to one inch from each edge of the batt, though if desired, larger spaces of two to three inches or even more may be used. By leaving a portion of filter media extending past the first portion of the frame, the filters of the present invention may be butted to each other so as to form an excellent seal without any gap or spacing between filters. This full filter seal eliminates the possibility of contaminated air being passed through the apparatus without filtering.

Figure 2:
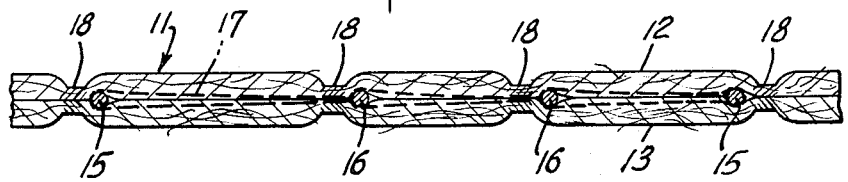
FIGURE 2 is an enlarged cross-sectional view taken along the line 2—2 of FIGURE 1.

The second portion of the frame is called the "center" portion. This portion will extend within the area formed by the first portion of the frame, and is necessary to prevent the center portion of the filter batts from buckling or bulging during use. The center portion may have virtually any size or shape and may be located as desired to prevent the buckling. For example, in the square filter two lines of frame may be spaced in the center of the material as depicted in FIGURE 1 or if a rectangular filter is being used, the center portion may be as shown in FIGURE 2.

The first and second portions of the frame may be made of various material, such as metal, plastic, etc. The material should be semi-rigid. Suitable material is No. 9 gauge galvanized wire. It is important that the frame have a relatively small cross-sectional area so that it does not reduce, to any substantial amount, the amount of filtering area yet performs its support function. Also the frame should not be so large as to cause a bulge in the filtering material and increase the thickness of the filtering material at the portion where the filtering material is attached. As mentioned above, No. 9 gauge wire has been found suitable though thin plastic strips may also be used. The third portion extending between the sides of the first portion should be of material which can be heat sealed to the filter layers and is resilient. Various strings or ropes may be used which can be drawn taut about the first portion of the frame and which can be secured to the filter layers. Suitable materials are nylon, polypropylene, polyester, cotton, etc. The tautness of the third portion and the intermittent securing of the third portion to the filter layers subsantially reduces the slack between the frame and filter material producing a stable filter which does not buckle in use.

The batts with the frame therebetween are laminated together by sealing the batts along the outer edge of the first portion of the frame and along a portion of the second or center portion of the frame. The heat sealing along the second portion of the frame also secures the third portion to the batts. This sealing may be accomplished by heat if thermoplastic fibers are used as the filtering material, or by solvent bonding along the frames, etc. In the preferred embodiment of the present invention, when the filter material is made from thermoplastic fibers, such as, the polyesters, it is preferred that the two batts be heat sealed about the outer portion of the first portion of the frame and heat sealed along a portion of the periphery of the central portion of the frame. When polyester fibers are used, the heat seal may be accomplished at temperatures from about 350° to 450° F. and pressures from about 60 to 100 pounds per square inch for short periods, say 15 seconds.

Although I have described certain preferred embodiments of my present invention in considerable detail, it is to be understood that the description is intended to be illustrative and not restrictive, as many details may be modified or changed without departing from the spirit or scope of the invention. Accordingly the invention is to be limited only by the appended claims viewed in light of the prior art.

What is claimed is:

1. A self-supported filter comprising at least two layers of a permeable fibrous filter material containing thermoplastic material, and a support frame between said layers, said layers being of substantially the same size and shape and being disposed in face to face relationship and said frame comprising a first portion substantially rectangular in shape extending adjacent substantially the entire periphery of said layers but spaced inwardly therefrom, a second portion disposed within the area defined by said first portion, and a resilient third portion comprising at least one string extending from one side on said rectangular first portion to the opposite side thereof to stabilize and prevent the filter materials from buckling during use, said layers being secured together along the outer periphery of the first portion of said frame and said layers and said resilient third portion being secured at the second portion of said frame.

2. A self-supported filter according to claim 1 wherein the resilient third portion of the frame comprises a plurality of nylon strings.

3. A self-supported filter according to claim 1 wherein the filter material containing thermoplastic material comprises thermoplastic fibers.

4. A self-supported filter according to claim 1 wherein one fibrous layer contains a tackifier.

References Cited
UNITED STATES PATENTS

| | | | |
|---|---|---|---|
| 1,700,126 | 1/1929 | Goodloe | 55—492 X |
| 1,873,573 | 8/1932 | Galvin | 55—492 |
| 2,124,370 | 7/1938 | Gaarder | 55—492 |
| 2,138,736 | 11/1938 | Gaarder | 55—519 X |
| 2,521,984 | 9/1950 | Lang | 55—486 |
| 2,537,217 | 1/1951 | Farr | 55—492 X |
| 2,576,864 | 11/1951 | Valente | 210—491 |
| 2,751,039 | 6/1956 | Hanly | 55—524 |
| 2,845,181 | 7/1958 | Rathe et al. | 210—486 |
| 2,865,466 | 12/1958 | Frohmader | 55—524 |
| 3,017,239 | 1/1962 | Rodman. | |
| 3,017,698 | 1/1962 | Hambrecht et al. | |
| 3,053,394 | 9/1962 | Morrison | 210—499 X |
| 3,154,393 | 10/1964 | Klein et al. | |
| 3,273,327 | 9/1966 | Hoffman | 55—507 |

FRANK W. LUTTER, *Primary Examiner.*

HARRY B. THORNTON, *Examiner.*

S. W. SOKOLOFF, *Assistant Examiner.*